United States Patent
Hong (10) Patent No.: US 11,212,724 B2
(45) Date of Patent: Dec. 28, 2021

(54) CELL RESELECTION METHOD AND DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 21 days.

(21) Appl. No.: 16/802,312

(22) Filed: Feb. 26, 2020

(65) Prior Publication Data
US 2020/0329410 A1 Oct. 15, 2020

Related U.S. Application Data

(63) Continuation of application No. PCT/CN2017/100527, filed on Sep. 5, 2017.

(51) Int. Cl.
*H04W 36/00* (2009.01)
*H04W 36/08* (2009.01)
*B64C 39/02* (2006.01)

(52) U.S. Cl.
CPC ....... *H04W 36/0094* (2013.01); *B64C 39/024* (2013.01); *H04W 36/0007* (2018.08); *H04W 36/0058* (2018.08); *H04W 36/08* (2013.01)

(58) Field of Classification Search
None
See application file for complete search history.

(56) References Cited

U.S. PATENT DOCUMENTS

| | | | |
|---|---|---|---|
| 5,648,955 A | 7/1997 | Jensen et al. | |
| 5,671,219 A | 9/1997 | Jensen et al. | |
| 5,768,264 A | 6/1998 | Anderson et al. | |
| 5,818,820 A | 10/1998 | Anderson et al. | |
| 6,088,590 A | 7/2000 | Anderson et al. | |
| 6,112,080 A | 8/2000 | Anderson et al. | |
| 6,161,013 A | 12/2000 | Anderson et al. | |
| 6,229,792 B1 | 5/2001 | Anderson et al. | |
| 6,532,365 B1 | 3/2003 | Anderson et al. | |

(Continued)

FOREIGN PATENT DOCUMENTS

| CN | 102647767 A | 8/2012 |
|---|---|---|
| CN | 105182992 A | 12/2015 |

(Continued)

OTHER PUBLICATIONS

Kyocera, Considerations for cell selection and reselection with UAVs, R2-1709520, 3GPP TSG-RAN WG2 #99, Berlin, Germany, Aug. 21-25, 2017, 2 pages.

(Continued)

*Primary Examiner* — Kenny S Lin
(74) *Attorney, Agent, or Firm* — Finnegan, Henderson, Farabow, Garrett & Dunner, L.L.P.

(57) ABSTRACT

A cell reselection method applied to a base station, includes: configuring a measurement parameter adjustment rule to be used by an unmanned aerial vehicle (UAV) in cell reselection, the measurement parameter adjustment rule including at least one UAV altitude level and each UAV altitude level corresponding to at least one altitude adjustment parameter; and sending the measurement parameter adjustment rule to the UAV.

14 Claims, 8 Drawing Sheets

A measurement parameter adjustment rule is configured to be used by a UAV in cell reselection, the measurement parameter adjustment rule including at least one UAV altitude level and each UAV altitude level corresponding to at least one altitude adjustment parameter — 110

The measurement parameter adjustment rule is sent to the UAV, such that the UAV determines, according to the measurement parameter adjustment rule, an altitude adjustment parameter corresponding to a current altitude of the UAV, adjusts a corresponding measurement parameter for cell reselection according to the corresponding altitude adjustment parameter, and performs cell reselection by using the adjusted measurement parameter — 120

(56) References Cited

U.S. PATENT DOCUMENTS

| | | | |
|---|---|---|---|
| 2014/0012529 A1* | 1/2014 | Lee | G01C 5/06 |
| | | | 702/94 |
| 2014/0172193 A1* | 6/2014 | Levien | B64C 39/024 |
| | | | 701/2 |
| 2015/0141013 A1* | 5/2015 | Cui | H04W 48/20 |
| | | | 455/436 |
| 2015/0327133 A1* | 11/2015 | Yiu | H04W 48/20 |
| | | | 455/436 |
| 2017/0142766 A1* | 5/2017 | Kim | H04W 48/20 |
| 2017/0295069 A1* | 10/2017 | Sweet, III | B64C 39/024 |
| 2018/0288713 A1* | 10/2018 | Kosseifi | H04W 52/281 |
| 2018/0324656 A1* | 11/2018 | Chen | H04W 36/08 |
| 2020/0187031 A1* | 6/2020 | Kazmi | H04W 24/08 |
| 2020/0404555 A1* | 12/2020 | Okvist | H04W 36/0083 |

FOREIGN PATENT DOCUMENTS

| | | |
|---|---|---|
| CN | 105704667 A | 6/2016 |
| EP | 2 661 125 A1 | 6/2013 |
| WO | WO 95/26094 | 9/1995 |

OTHER PUBLICATIONS

KDDI, Proposal of potential LTE enhancements for Aerial Vehicles. R2-1705999, 3GPP TSG-RAN2 Meeting #98, Hangzhou, China, May 15-19, 2017, 5 pages.

Huawei, HiSilicon, Analysis and Simulation of Handover Issues for Drones, R2-1708544, 3GPP TSG-RAN WG2, Meeting #99, Berlin, Germany, Aug. 21-25, 2017, 9 pages.

Huawei, HiSilicon, Mobility enhancement for Drones, R2-1704997, 3GPP TSG-RAN WG2, Meeting #98, Hangzhou, China, May 15-19, 2017, 6 pages.

International Search Report in the International Application No. PCT/CN2017/100527, dated May 30, 2018.

English translation of the Written Opinion of the International Search Authority in the International Application No. PCT/CN2017/100527, dated May 30, 2018.

Supplementary European Search Report in the European Application No. 17924362.1, dated Jul. 15, 2020.

First Office Action dated May 24, 2021, from the State Intellectual Property Office of People's Republic of China in counterpart Chinese Application No. CN 201780001542.2.

* cited by examiner

CELL RESELECTION METHOD AND DEVICE

CROSS-REFERENCE TO RELATED APPLICATION

This application is a continuation of International Application No. PCT/CN2017/100527 filed on Sep. 5, 2017, the content of which is incorporated herein by reference in its entirety.

TECHNICAL FIELD

The disclosure relates to the field of communication, and more particularly, to a method and device for cell reselection.

BACKGROUND

An unmanned aerial vehicle (UAV), such as an unmanned aircraft, is controlled by radio remote control equipment and a program control device.

With the continuous development of the UAV technology, UAVs have been widely used. In the related art, in order to further expand an application range of UAVs, cellular networks are required to serve UAVs as requested by the UAVs. However, after a UAV is flying high, a number of detectable neighboring cells may increase, which results in that the UAV needs to frequently perform neighboring cell measurement and determine whether to perform a reselection of a neighboring cell, thus increasing the power consumption of the UAV.

SUMMARY

According to a first aspect of embodiments of the disclosure, a method for cell reselection, applied to a base station, includes: configuring a measurement parameter adjustment rule to be used by an unmanned aerial vehicle (UAV) in cell reselection, the measurement parameter adjustment rule including at least one UAV altitude level and each UAV altitude level corresponding to at least one altitude adjustment parameter; and sending the measurement parameter adjustment rule to the UAV.

According to a second aspect of embodiments of the disclosure, a method for cell reselection, applied to a UAV, includes: receiving from a base station a measurement parameter adjustment rule for cell reselection, the measurement parameter adjustment rule including at least one UAV altitude level and each UAV altitude level corresponding to at least one altitude adjustment parameter; determining an altitude adjustment parameter corresponding to a current altitude of the UAV according to the measurement parameter adjustment rule; adjusting a corresponding measurement parameter for cell reselection according to the corresponding altitude adjustment parameter; and performing cell reselection by using the adjusted measurement parameter.

According to a third aspect of embodiments of the disclosure, a base station includes: a processor; and a memory storing processor-executable instructions. The processor is configured to: configure a measurement parameter adjustment rule to be used by a UAV in cell reselection, the measurement parameter adjustment rule including at least one UAV altitude level, and each UAV altitude level corresponding to at least one altitude adjustment parameter; and send the measurement parameter adjustment rule to the UAV.

According to a fourth aspect of embodiments of the disclosure, a device for cell reselection, applied to a UAV, includes: a processor; and a memory storing processor-executable instructions. The processor is configured to: receive from a base station a measurement parameter adjustment rule for cell reselection, the measurement parameter adjustment rule including at least one UAV altitude level, and each UAV altitude level corresponding to at least one altitude adjustment parameter; determine an altitude adjustment parameter corresponding to a current altitude of the UAV according to the measurement parameter adjustment rule; adjust a corresponding measurement parameter for cell reselection according to the corresponding altitude adjustment parameter; and perform cell reselection by using the adjusted measurement parameter.

The technical solutions provided by the embodiments of the disclosure may include the following beneficial effects.

In the embodiments of the disclosure, a base station may configure a measurement parameter adjustment rule to be used by a UAV in cell reselection, the measurement parameter adjustment rule including at least one UAV altitude level, and each UAV altitude level corresponding to at least one altitude adjustment parameter. The measurement parameter adjustment rule is sent to the UAV, such that the UAV may determine, according to the measurement parameter adjustment rule, an altitude adjustment parameter corresponding to a current altitude of the UAV, adjust a corresponding measurement parameter for cell reselection according to the corresponding altitude adjustment parameter, and perform cell reselection by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

In the embodiments of the disclosure, a UAV may receive from a base station a measurement parameter adjustment rule for cell reselection, the measurement parameter adjustment rule including at least one UAV altitude level, and each UAV altitude level corresponding to at least one altitude adjustment parameter. An altitude adjustment parameter corresponding to a current altitude of the UAV is determined according to the measurement parameter adjustment rule. A corresponding measurement parameter for cell reselection is adjusted according to the corresponding altitude adjustment parameter. Cell reselection is performed by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

It is to be understood that the above general descriptions and detailed descriptions below are only exemplary and explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the disclosure are for the purpose of describing particular embodiments only, and are not intended to limit the disclosure. It is to be understood that term "and/or" used in the disclosure refers to and includes one or any or all possible combinations of multiple associated items that are listed. It is also to be understood that although the terms "first," "second," "third," etc. may be used in the disclosure to describe various information, such information should not be limited to these terms. These terms are only used to distinguish the same type of information from each other. For example, without departing from the scope of the disclosure, first information may also be referred to as second information and, similarly, second information may also be referred to as first information. The term "if" used here may be explained as "while" or "when" or "responsive to determining," which depends on the context.

Figure 1:
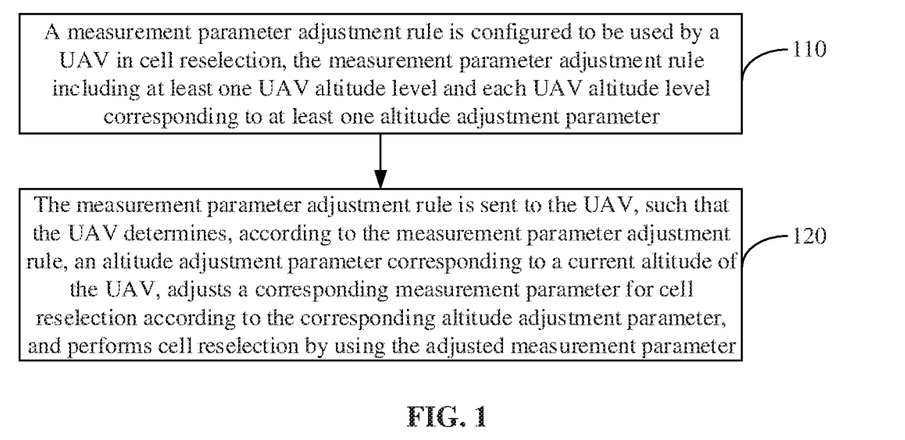
FIG. 1 is a flowchart illustrating a method for cell reselection, according to an exemplary embodiment.
Figure 2:
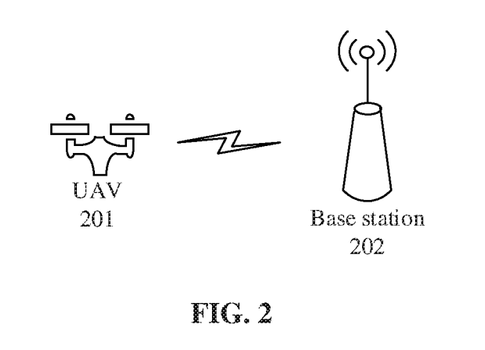
FIG. 2 is a scene diagram illustrating a method for cell reselection, according to an exemplary embodiment.

FIG. 1 is a flowchart illustrating a method for cell reselection, according to an exemplary embodiment. FIG. 2 is a scene diagram illustrating the method for cell reselection, according to an exemplary embodiment. The method for cell reselection may be applied to a base station. The base station may configure a measurement parameter adjustment rule to be used by an unmanned aerial vehicle (UAV) in cell reselection. As illustrated in FIG. 1, the method for cell reselection may include the following steps.

In step 110, a measurement parameter adjustment rule is configured to be used by a UAV in cell reselection. The measurement parameter adjustment rule includes at least one UAV altitude level, and each UAV altitude level corresponds to at least one altitude adjustment parameter.

In the embodiments of the disclosure, the UAV is a cellular network UAV, that is, the UAV is capable of receiving services provided by a cellular network.

When configuring a measurement parameter for a cellular network UAV in an idle state, in addition to configuring a conventional cell reselection measurement parameter, the base station also adds a measurement parameter adjustment rule related to a UAV altitude. And the measurement parameter adjustment rule includes at least one UAV altitude level, and each UAV altitude level corresponds to at least one altitude adjustment parameter.

The UAV altitude level is configured by the base station, there may be one or more levels. For example, one UAV altitude level ranges from 50 m to 100 m, and another UAV altitude level ranges from 100 m to 200 m.

The altitude adjustment parameter is also configured by the base station, and there may be one or more parameters. Each altitude adjustment parameter is used to adjust the measurement parameter related to the UAV altitude. For example, the altitude adjustment parameter is an altitude offset value. The altitude offset value is a measurement parameter for a cell reselection hysteresis value.

In step 120, the measurement parameter adjustment rule is sent to the UAV, such that the UAV determines, according to the measurement parameter adjustment rule, an altitude adjustment parameter corresponding to a current altitude of the UAV, adjusts a corresponding measurement parameter for cell reselection according to the corresponding altitude adjustment parameter, and performs cell reselection by using the adjusted measurement parameter.

In the embodiments of the disclosure, sending, by the base station, a measurement parameter adjustment rule to the UAV may enable the UAV to determine, according to the measurement parameter adjustment rule, an altitude adjustment parameter corresponding to a current altitude of the UAV, adjust a corresponding measurement parameter for cell reselection according to the corresponding altitude adjustment parameter, and perform cell reselection by using the adjusted measurement parameter.

In addition, in the embodiments of the disclosure, the content in the measurement parameter adjustment rule configured by the base station is not fixed. The content may be adjusted regularly or in real time according to an actual situation, and the adjusted measurement parameter adjustment rule is sent to the UAV.

In an exemplary scenario, as illustrated in FIG. 2, a UAV 201 and a base station 202 are included. The base station 202 configures a measurement parameter adjustment rule for the UAV 201 to use in cell reselection, and sends the measurement parameter adjustment rule to the UAV 201. The measurement parameter adjustment rule includes at least one UAV altitude level, and each UAV altitude level corresponds to at least one altitude adjustment parameter. After receiving the measurement parameter adjustment rule sent by the base station 202, the UAV 201 determines, according to the measurement parameter adjustment rule, an altitude adjustment parameter corresponding to a current altitude of the UAV, adjusts a corresponding measurement parameter for cell reselection according to the corresponding altitude adjustment parameter, and performs cell reselection by using the adjusted measurement parameter.

In the embodiments, a base station may configure a measurement parameter adjustment rule to be used by a UAV in cell reselection, the measurement parameter adjustment rule includes at least one UAV altitude level, and each UAV altitude level corresponds to at least one altitude adjustment parameter. The measurement parameter adjustment rule is sent to the UAV, such that the UAV may determine, according to the measurement parameter adjustment rule, an altitude adjustment parameter corresponding to a current altitude of the UAV, adjust a corresponding measurement parameter for cell reselection according to the corresponding altitude adjustment parameter, and perform cell reselection by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

Figure 3:
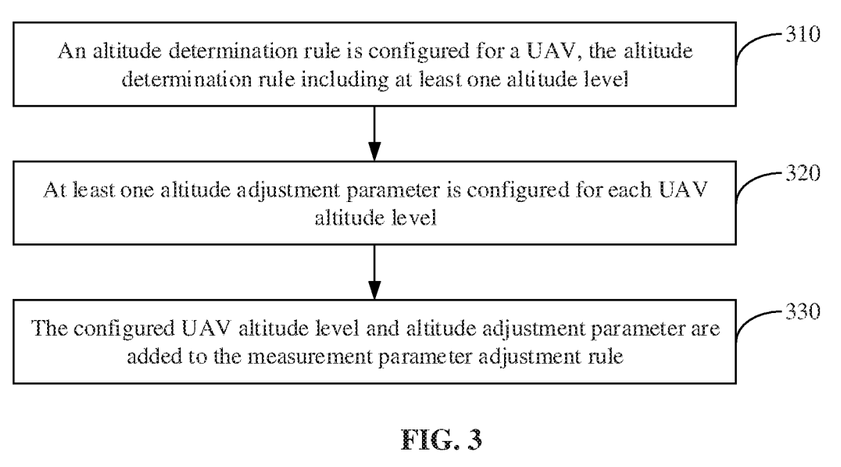
FIG. 3 is a flowchart illustrating a method for cell reselection, according to an exemplary embodiment.

FIG. 3 is a flowchart of configuring a measurement parameter adjustment rule for the UAV to use in cell reselection (step 110 in FIG. 1), according to an exemplary embodiment.

In step 310, an altitude determination rule is configured for the UAV. The altitude determination rule includes at least one altitude level.

In the embodiments of the disclosure, the altitude determination rule is a rule for determining correspondence between a UAV altitude and a UAV altitude level. For example, when the UAV altitude is 100 m to 200 m, the corresponding UAV altitude level is a first altitude level. When the UAV altitude is 50 m to 100 m, the corresponding UAV altitude level is a second altitude level.

In step 320, at least one altitude adjustment parameter is configured for each UAV altitude level.

In the embodiments of the disclosure, the altitude adjustment parameter may be an altitude offset value for a cell reselection hysteresis value, an altitude scale factor for a cell reselection timer, or both. Moreover, the base station may also configure a plurality of candidate altitude adjustment parameters at each altitude level, and then select one of the candidate altitude adjustment parameters to be configured for the corresponding altitude level.

For example, when the UAV altitude is 100 m to 200 m, the corresponding UAV altitude level is a first altitude level, and the base station configures the first altitude level with five candidate altitude offset values, which are 2 dB, 4 dB, 6 dB, 8 dB, 10 dB, respectively. The base station may select 2 dB from the five candidate altitude offset values as the altitude offset value corresponding to the first altitude level according to an actual situation.

In step 330, the configured UAV altitude level and altitude adjustment parameter are added to the measurement parameter adjustment rule.

In the embodiments of the disclosure, the altitude level and the altitude adjustment parameter configured by the base station are not fixed, and may be adjusted regularly or in real time according to an actual situation, and the adjusted measurement parameter adjustment rule is sent to the UAV.

In the embodiments, an altitude determination rule including at least one UAV altitude level is configured for a UAV, at least one altitude adjustment parameter is configured for each UAV altitude level, and the configured UAV altitude level and altitude adjustment parameter are added to the altitude determination rule, thereby implementing the configuration of a measurement parameter adjustment rule and also improving configuration efficiency.

In one embodiment, in step 110, the at least one UAV altitude level configured by the base station for the UAV may include a first altitude level, and/or a second altitude level, and/or a third altitude level. Each UAV altitude level corresponds to a UAV altitude segment. The respective UAV altitude segments of different UAV altitude levels are different from each other.

In the embodiments of the disclosure, each of the first altitude level, the second altitude level and the third altitude level corresponds to a UAV altitude segment, and the respective UAV altitude segments are different.

For example, the first altitude level is a high altitude, and a corresponding UAV altitude segment is 100 m to 200 m; the second altitude level is a medium altitude, and a corresponding UAV altitude segment is 50 m to 100 m; and the third altitude level is a low altitude, and a corresponding UAV altitude segment is 10 m to 50 m.

In the embodiments, a UAV altitude is divided into different UAV altitude segments each corresponding to a UAV altitude level, thereby implementing an association between UAV altitudes and UAV altitude levels, and improving the efficiency of a UAV determining a UAV altitude level corresponding to a current flight altitude.

In one embodiment, in step 110, the at least one altitude adjustment parameter configured by the base station for the UAV may include an altitude offset value for a first measurement parameter and/or an altitude scale factor for a second measurement parameter. Different UAV altitude levels correspond to different values of the same altitude adjustment parameter. The first measurement parameter is a cell reselection hysteresis value. The second measurement parameter is a cell reselection timer.

In the embodiments of the disclosure, the cell reselection hysteresis value and the cell reselection timer are both measurement parameters related to the UAV altitude. For the two measurement parameters, the base station may configure the corresponding altitude offset value and altitude scale factor at each UAV altitude level, and the respective altitude offset values of different UAV altitude levels are different, and the respective altitude scale factors of different UAV altitude levels are different.

For example, the altitude offset value configured by the base station at the high altitude is 2 dB, and the configured altitude scale factor is 2. The altitude offset value configured at the medium altitude is 1 dB, and the configured altitude scale factor is 1.

In some embodiments, the functions of the two measurement parameters, i.e., the cell reselection hysteresis value and the cell reselection timer, are to prevent a ping-pong effect. The ping-pong effect refers to changing back and forth between two different states. In a mobile communication system, if the signal strength of two base stations changes drastically in a certain region, a terminal will hand over back and forth between the two base stations. This situation is the ping-pong effect.

In the embodiments, by configuring an altitude offset value for a cell reselection hysteresis value and an altitude scale factor for a cell reselection timer, a UAV may dynamically adjust two measurement parameters namely the cell reselection hysteresis value and the cell reselection timer at different flight altitudes, so that a ping-pong effect is avoided, thereby improving the stability of cell reselection.

In embodiments of the disclosure, in step 120, the measurement parameter adjustment rule may be sent to the UAV by adopting, but not limited to, the following implementation manner: the measurement parameter adjustment rule is broadcast to the UAV through system signaling.

In the embodiments of the disclosure, the measurement parameter adjustment rule configured by the base station for the UAV may be broadcast by the base station to the cellular network UAV in the idle state through system signaling.

In the embodiments, a measurement parameter adjustment rule is broadcast to a UAV through system signaling, so that a plurality of UAVs may receive the measurement parameter adjustment rule broadcast by a base station, and may dynamically adjust a measurement parameter for cell reselection according to an altitude change, thereby reducing the power consumption of each UAV.

Figure 4:
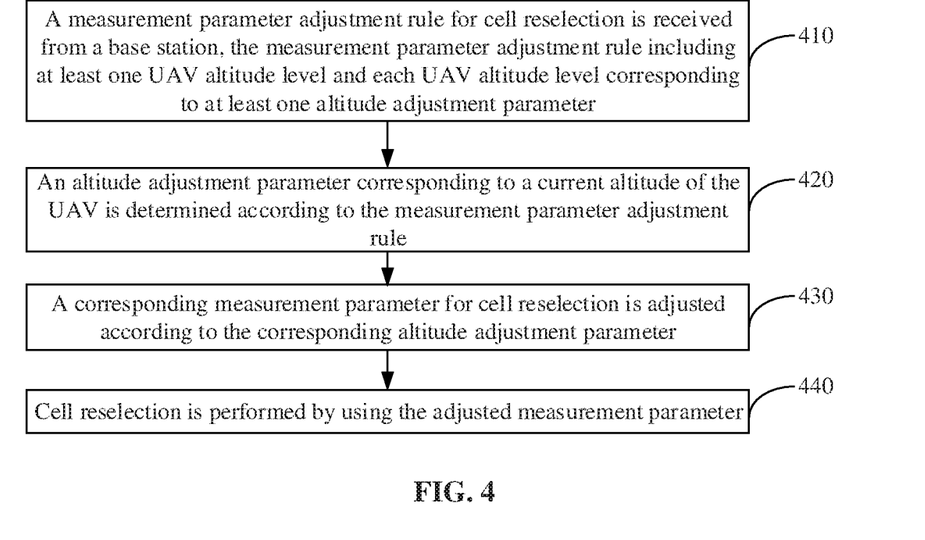
FIG. 4 is a flowchart illustrating a method for cell reselection, according to an exemplary embodiment.

FIG. 4 is a flowchart illustrating a method for cell reselection, according to an exemplary embodiment. The method for cell reselection may be applied to a UAV. As illustrated in FIG. 4, the method for cell reselection may include the following steps.

In step 410, a measurement parameter adjustment rule for cell reselection is received from a base station. The measurement parameter adjustment rule includes at least one UAV altitude level, and each UAV altitude level corresponds to at least one altitude adjustment parameter.

In step 420, an altitude adjustment parameter corresponding to a current altitude of the UAV is determined according to the measurement parameter adjustment rule.

In step 430, a corresponding measurement parameter for cell reselection is adjusted according to the corresponding altitude adjustment parameter.

In step 440, cell reselection is performed by using the adjusted measurement parameter.

In the embodiment, a UAV may receive a measurement parameter adjustment rule for cell reselection from a base station, the measurement parameter adjustment rule including at least one UAV altitude level, and each UAV altitude level corresponding to at least one altitude adjustment parameter. An altitude adjustment parameter corresponding to a current altitude of the UAV is determined according to the measurement parameter adjustment rule. A corresponding measurement parameter for cell reselection is adjusted according to the corresponding altitude adjustment parameter. Cell reselection is performed by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

Figure 5:
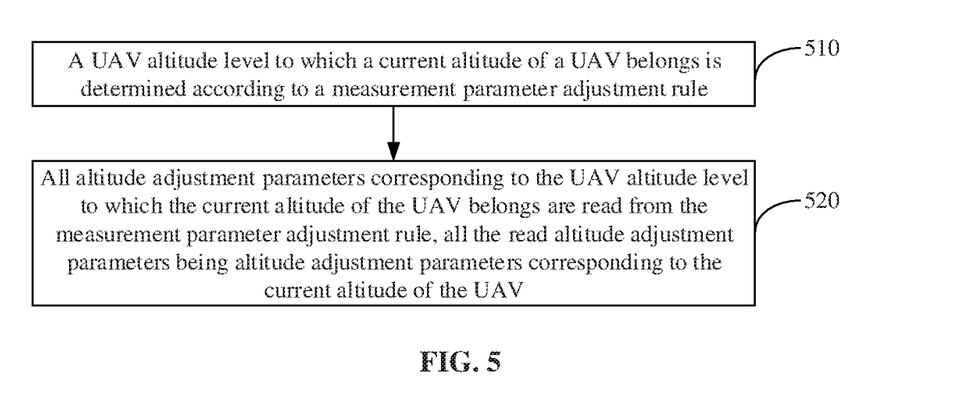
FIG. 5 is a flowchart illustrating a method for cell reselection, according to an exemplary embodiment.

FIG. 5 is a flowchart of determining the altitude adjustment parameter corresponding to the current altitude of the UAV according to the measurement parameter adjustment rule (step 420 in FIG. 4), according to an exemplary embodiment.

In step 510, according to the measurement parameter adjustment rule, a UAV altitude level to which a current altitude of the UAV belongs is determined.

In step 520, all altitude adjustment parameters corresponding to the UAV altitude level to which the current altitude of the UAV belongs are read from the measurement parameter adjustment rule. All the read altitude adjustment parameters are altitude adjustment parameters corresponding to the current altitude of the UAV.

For example, the measurement parameter adjustment rule configured by the base station for the UAV is illustrated in Table 1.

TABLE 1

| UAV Altitude Level | Altitude Offset Value for Cell Reselection Hysteresis Value | Altitude Scale Factor for Cell Reselection Timer |
| --- | --- | --- |
| First Altitude Level (100-200 m) | 2 dB | 2 |
| Second Altitude Level (50-100 m) | 1 dB | 1 |

If the current altitude of the UAV is 150 m, it may be determined that the UAV altitude level to which the current altitude of the UAV belongs is the first altitude level. The first altitude level corresponds to two altitude adjustment parameters, including an altitude offset value of 2 dB for a cell reselection hysteresis value and an altitude scale factor of 2 for a cell reselection timer.

In the embodiment, a base station divides a UAV altitude into different UAV altitude segments. Each UAV altitude segment corresponds to one UAV altitude level. Each UAV altitude level corresponds to one or more altitude adjustment parameters. Therefore, a UAV may determine, according to a measurement parameter adjustment rule, a UAV altitude level to which a current altitude of the UAV belongs, and read, from the measurement parameter adjustment rule, all altitude adjustment parameters corresponding to the UAV altitude level to which the current altitude of the UAV belongs, all the read altitude adjustment parameters being altitude adjustment parameters corresponding to the current altitude of the UAV, thereby improving the efficiency of the UAV determining, according to the measurement parameter adjustment rule, the altitude adjustment parameter corresponding to the current altitude of the UAV.

In one embodiment, in step 430, the corresponding altitude adjustment parameter includes: an altitude offset value for a first measurement parameter. The first measurement parameter is a cell reselection hysteresis value. The corresponding measurement parameter for cell reselection may be adjusted according to the corresponding altitude adjustment parameter by adopting, but not limited to, the following implementation manner: a sum of the cell reselection hysteresis value and the altitude offset value for the cell reselection hysteresis value is calculated, as an adjusted cell reselection hysteresis value, as illustrated in Formula (1).

$$\text{Adjusted cell reselection hysteresis value} = \text{cell reselection hysteresis value} + \text{altitude offset value} \quad \text{Formula (1)}$$

In the embodiment, by adjusting a cell reselection hysteresis value, a UAV may use different cell reselection hysteresis values for cell reselection at different flight altitudes, so that a ping-pong effect can be avoided, thereby improving the stability of cell reselection.

In one embodiment, in step 430, the corresponding altitude adjustment parameter includes: an altitude scale factor for a second measurement parameter. The second measurement parameter is a cell reselection timer. The corresponding measurement parameter for cell reselection may be adjusted according to the corresponding altitude adjustment parameter by adopting, but not limited to, the following implementation manner: a product of the cell reselection timer and the altitude scale factor for the cell reselection timer is calculated, as an adjusted cell reselection timer, as illustrated in Formula (2).

$$\text{Adjusted cell reselection timer} = \text{cell reselection timer} \times \text{altitude scale factor} \quad \text{Formula (2)}$$

In the embodiment, by adjusting a cell reselection timer, a UAV may use different cell reselection timers for cell reselection at different flight altitudes, so that a ping-pong effect can be avoided, thereby improving the stability of cell reselection.

Corresponding to the embodiments of method for cell reselection, the disclosure also provides embodiments of a device for cell reselection.

Figure 6:
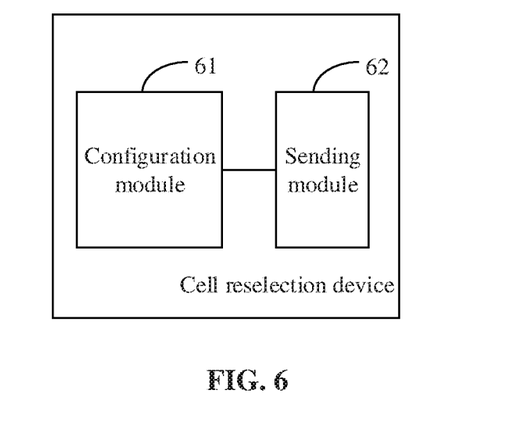
FIG. 6 is a block diagram illustrating a device for cell reselection, according to an exemplary embodiment.

FIG. 6 is a block diagram illustrating a device for cell reselection, according to an exemplary embodiment. The device is applied to a base station. The base station may configure a measurement parameter adjustment rule to be used by a UAV in cell reselection, and is configured to perform the method for cell reselection illustrated in FIG. 1. As illustrated in FIG. 6, the device for cell reselection may include a configuration module 61 and a sending module 62.

The configuration module 61 is configured to configure a measurement parameter adjustment rule to be used by a UAV in cell reselection. The measurement parameter adjustment rule includes at least one UAV altitude level, and each UAV altitude level corresponds to at least one altitude adjustment parameter.

The sending module 62 is configured to send the measurement parameter adjustment rule to the UAV, such that the UAV determines, according to the measurement parameter adjustment rule, an altitude adjustment parameter corresponding to a current altitude of the UAV, adjusts a corresponding measurement parameter for cell reselection according to the corresponding altitude adjustment parameter, and performs cell reselection by using the adjusted measurement parameter.

In the embodiment, a base station may configure a measurement parameter adjustment rule to be used by a UAV in cell reselection, the measurement parameter adjustment rule includes at least one UAV altitude level, and each UAV altitude level corresponds to at least one altitude adjustment parameter. The measurement parameter adjustment rule is sent to the UAV, such that the UAV may determine, according to the measurement parameter adjustment rule, an altitude adjustment parameter corresponding to a current altitude of the UAV, adjust a corresponding measurement parameter for cell reselection according to the corresponding altitude adjustment parameter, and perform cell reselection by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

Figure 7:
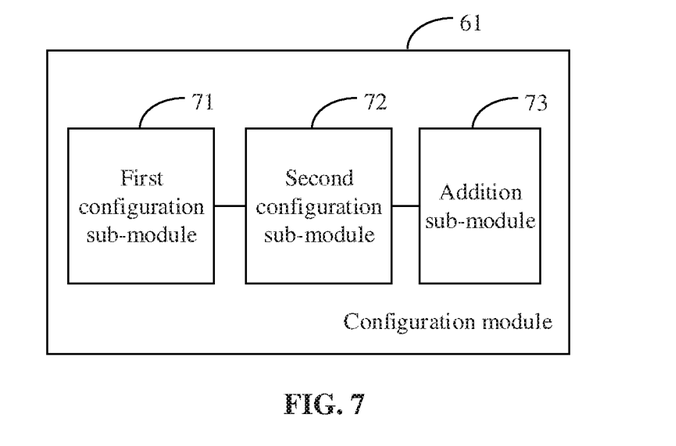
FIG. 7 is a block diagram illustrating a device for cell reselection, according to an exemplary embodiment.

FIG. 7 is a block diagram illustrating a device for cell reselection, according to an exemplary embodiment. The device is applied to a base station. The base station may configure a measurement parameter adjustment rule to be used by a UAV in cell reselection, and is on the basis of the device illustrated in FIG. 6. As illustrated in FIG. 7, the configuration module 61 may include a first configuration sub-module 71, a second configuration sub-module 72 and an addition sub-module 73.

The first configuration sub-module 71 is configured to configure an altitude determination rule for a UAV, the altitude determination rule including at least one altitude level.

The second configuration sub-module 72 is configured to configure at least one altitude adjustment parameter for each altitude level.

The addition sub-module 73 is configured to add the altitude level and the altitude adjustment parameter to the measurement parameter adjustment rule.

In the embodiment, an altitude determination rule is configured for a UAV including at least one UAV altitude level, at least one altitude adjustment parameter is configured for each UAV altitude level, and the configured UAV altitude level and altitude adjustment parameter are added to the altitude determination rule, thereby implementing the configuration of a measurement parameter adjustment rule and also improving configuration efficiency.

In one embodiment, the at least one UAV altitude level may include a first altitude level, and/or a second altitude level, and/or a third altitude level. Each UAV altitude level may correspond to a UAV altitude segment. The respective UAV altitude segments of different UAV altitude levels are different with each other.

In the embodiment, a UAV altitude is divided into different UAV altitude segments each corresponding to a UAV altitude level, thereby implementing an association between UAV altitudes and UAV altitude levels, and improving the efficiency of a UAV determining a UAV altitude level corresponding to a current flight altitude.

In one embodiment, the at least one altitude adjustment parameter may include: an altitude offset value for a first measurement parameter and/or an altitude scale factor for a second measurement parameter. Different UAV altitude levels may correspond to different values of the same altitude adjustment parameter. The first measurement parameter may be a cell reselection hysteresis value. The second measurement parameter may be a cell reselection timer.

In the embodiment, by configuring an altitude offset value for a cell reselection hysteresis value and an altitude scale factor for a cell reselection timer, a UAV may dynamically adjust two measurement parameters namely the cell reselection hysteresis value and the cell reselection timer at different flight altitudes, so that a ping-pong effect is avoided, thereby improving the stability of cell reselection.

Figure 8:
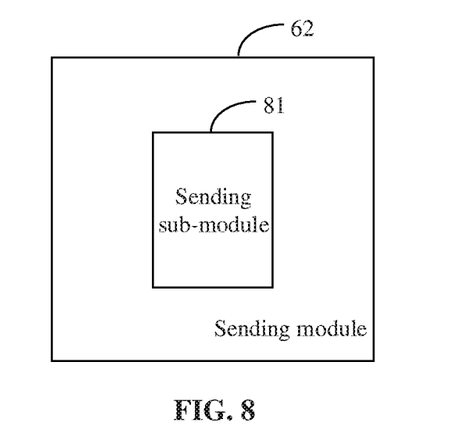
FIG. 8 is a block diagram illustrating a device for cell reselection, according to an exemplary embodiment.

FIG. 8 is a block diagram illustrating a device for cell reselection, according to an exemplary embodiment. The device is applied to a base station. The base station may configure a measurement parameter adjustment rule to be used by a UAV in cell reselection, and is on the basis of the device illustrated in FIG. 6. As illustrated in FIG. 8, the sending module 62 may include a sending sub-module 81.

The sending sub-module 81 is configured to broadcast the measurement parameter adjustment rule to the UAV through system signaling.

In the embodiment, a measurement parameter adjustment rule is broadcast to a UAV through system signaling, so that a plurality of UAVs may receive the measurement parameter adjustment rule broadcast by a base station, and may dynamically adjust a measurement parameter for cell reselection according to an altitude change, thereby reducing the power consumption of each UAV.

Figure 9:
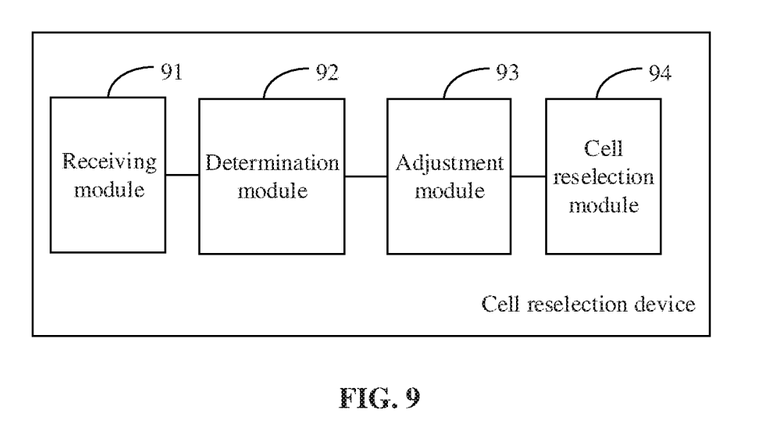
FIG. 9 is a block diagram illustrating a device for cell reselection, according to an exemplary embodiment.

FIG. 9 is a block diagram illustrating a device for cell reselection, according to an exemplary embodiment. The device is applied to a UAV, and is configured to perform the method for cell reselection illustrated in FIG. 4. As illustrated in FIG. 9, the device for cell reselection may include a receiving module 91, a determination module 92, an adjustment module 93, and a cell reselection module 94.

The receiving module 91 is configured to receive from a base station a measurement parameter adjustment rule for cell reselection, the measurement parameter adjustment rule including at least one UAV altitude level, and each UAV altitude level corresponding to at least one altitude adjustment parameter.

The determination module 92 is configured to determine an altitude adjustment parameter corresponding to a current altitude of the UAV according to the measurement parameter adjustment rule.

The adjustment module 93 is configured to adjust a corresponding measurement parameter for cell reselection according to the corresponding altitude adjustment parameter.

The cell reselection module 94 is configured to perform cell reselection by using the adjusted measurement parameter.

In the embodiment, a UAV may receive a measurement parameter adjustment rule for cell reselection from a base station. The measurement parameter adjustment rule includes at least one UAV altitude level, and each UAV altitude level corresponds to at least one altitude adjustment parameter. An altitude adjustment parameter corresponding to a current altitude of the UAV is determined according to the measurement parameter adjustment rule. A corresponding measurement parameter for cell reselection is adjusted according to the corresponding altitude adjustment parameter. Cell reselection is performed by using the adjusted measurement parameter. Therefore, the measurement parameter for cell reselection may be dynamically adjusted according to an altitude change during the flight of the UAV, thereby avoiding power consumption caused by frequent cell reselection performed by the UAV, and improving the stability of cell reselection.

Figure 10:
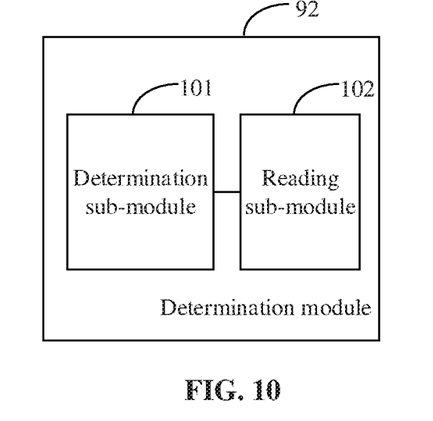
FIG. 10 is a block diagram illustrating a device for cell reselection, according to an exemplary embodiment.

FIG. 10 is a block diagram illustrating a device for cell reselection, according to an exemplary embodiment. The device is applied to a UAV, and is on the basis of the device illustrated in FIG. 9. As illustrated in FIG. 10, the determination module 92 may include a determination sub-module 101 and a reading sub-module 102.

The determination sub-module 101 is configured to determine, according to the measurement parameter adjustment rule, a UAV altitude level to which a current altitude of the UAV belongs.

The reading sub-module 102 is configured to read, from the measurement parameter adjustment rule, all altitude adjustment parameters corresponding to the UAV altitude level to which the current altitude of the UAV belongs. All the read altitude adjustment parameters are altitude adjustment parameters corresponding to the current altitude of the UAV.

In the embodiment, a base station divides a UAV altitude into different UAV altitude segments. Each UAV altitude segment corresponds to one UAV altitude level. Each UAV altitude level corresponds to one or more altitude adjustment parameters. Therefore, a UAV may determine, according to a measurement parameter adjustment rule, a UAV altitude level to which a current altitude of the UAV belongs, and read, from the measurement parameter adjustment rule, all altitude adjustment parameters corresponding to the UAV altitude level to which the current altitude of the UAV belongs, all the read altitude adjustment parameters being altitude adjustment parameters corresponding to the current altitude of the UAV, thereby improving the efficiency of the UAV determining, according to the measurement parameter adjustment rule, the altitude adjustment parameter corresponding to the current altitude of the UAV.

Figure 11:
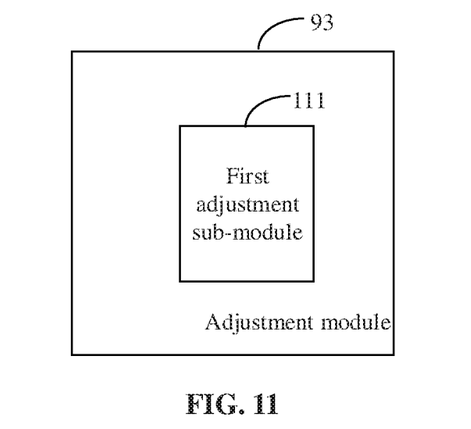
FIG. 11 is a block diagram illustrating a device for cell reselection, according to an exemplary embodiment.

FIG. 11 is a block diagram illustrating a device for cell reselection, according to an exemplary embodiment. The device is applied to a UAV, and is on the basis of the device illustrated in FIG. 9. The corresponding altitude adjustment parameter includes: an altitude offset value for a first measurement parameter, the first measurement parameter being a cell reselection hysteresis value. As illustrated in FIG. 11, the adjustment module 93 may include a first adjustment sub-module 111.

The first adjustment sub-module 111 is configured to calculate a sum of the cell reselection hysteresis value and the altitude offset value for the cell reselection hysteresis value, as an adjusted cell reselection hysteresis value.

In the embodiment, by adjusting a cell reselection hysteresis value, a UAV may use different cell reselection hysteresis values for cell reselection at different flight altitudes, so that a ping-pong effect can be avoided, thereby improving the stability of cell reselection.

Figure 12:
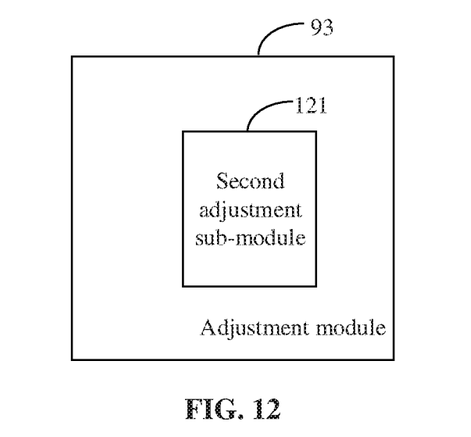
FIG. 12 is a block diagram illustrating a device for cell reselection, according to an exemplary embodiment.

FIG. 12 is a block diagram illustrating a device for cell reselection, according to an exemplary embodiment. The device is applied to a UAV, and is on the basis of the device illustrated in FIG. 9. The corresponding altitude adjustment parameter includes: an altitude scale factor for a second measurement parameter, the second measurement parameter being a cell reselection timer. As illustrated in FIG. 12, the adjustment module 93 may include a second adjustment sub-module 121.

The second adjustment sub-module 121 is configured to calculate a product of the cell reselection timer and the altitude scale factor for the cell reselection timer, as an adjusted cell reselection timer.

In the embodiment, by adjusting a cell reselection timer, a UAV may use different cell reselection timers for cell reselection at different flight altitudes, so that a ping-pong effect can be avoided, thereby improving the stability of cell reselection.

The disclosure also provides a non-transitory computer-readable storage medium. A computer program is stored on the storage medium. The computer program is configured to perform any of the above-described methods for cell reselection in connection with FIG. 1 to FIG. 3.

The disclosure also provides a non-transitory computer-readable storage medium. A computer program is stored on the storage medium. The computer program is configured to perform any of the above-described methods for cell reselection in connection with FIG. 4 to FIG. 5.

The disclosure also provides a device for cell reselection. The device is applied to a base station. The device includes: a processor; and a memory configured to store processor-executable instructions. The processor is configured to: configure a measurement parameter adjustment rule to be used by a UAV in cell reselection, the measurement parameter adjustment rule including at least one UAV altitude level, and each UAV altitude level corresponding to at least one altitude adjustment parameter; and send the measurement parameter adjustment rule to the UAV, such that the UAV determines, according to the measurement parameter adjustment rule, an altitude adjustment parameter corresponding to a current altitude of the UAV, adjusts a corresponding measurement parameter for cell reselection according to the corresponding altitude adjustment parameter, and performs cell reselection by using the adjusted measurement parameter.

Figure 13:
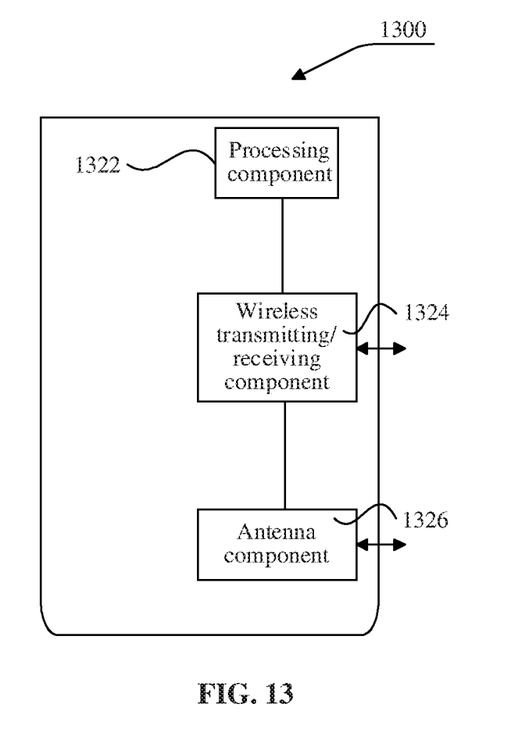
FIG. 13 is a schematic diagram illustrating a device for cell reselection, according to an exemplary embodiment.

FIG. 13 is a schematic diagram illustrating a device 1300 for cell reselection, according to an exemplary embodiment. The device 1300 may be provided as a base station or a UAV. Referring to FIG. 13, the device 1300 includes a processing component 1322, a wireless transmitting/receiving component 1324, an antenna component 1326, and a wireless interface-specific signal processing portion. The processing component 1322 may further include one or more processors configured to perform the any of the above-described methods for cell reselection.

The disclosure also provides a device for cell reselection. The device is applied to a UAV. The device includes: a processor; and a memory configured to store processor-executable instructions. The processor is configured to: receive from a base station a measurement parameter adjustment rule for cell reselection, the measurement parameter adjustment rule including at least one UAV altitude level, and each UAV altitude level corresponding to at least one altitude adjustment parameter; determine an altitude adjustment parameter corresponding to a current altitude of the UAV according to the measurement parameter adjustment rule; adjust a corresponding measurement parameter for cell reselection according to the corresponding altitude adjustment parameter; and perform cell reselection by using the adjusted measurement parameter.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for cell reselection, applied to a base station, the method comprising:
    configuring a measurement parameter adjustment rule to be used by an unmanned aerial vehicle (UAV) in cell reselection, the measurement parameter adjustment rule comprising at least one UAV altitude level and each UAV altitude level corresponding to at least one altitude adjustment parameter, wherein the at least one altitude adjustment parameter comprises at least one of: an altitude offset value for a first measurement parameter or an altitude scale factor for a second measurement parameter, different UAV altitude levels corresponding to different values of a same altitude adjustment parameter, the first measurement parameter being a cell reselection hysteresis value, and the second measurement parameter being a cell reselection timer; and
    sending the measurement parameter adjustment rule to the UAV.

2. The method of claim 1, wherein configuring the measurement parameter adjustment rule to be used by the UAV in cell reselection comprises:
    configuring an altitude determination rule for the UAV, the altitude determination rule comprising at least one altitude level;
    configuring at least one altitude adjustment parameter for each altitude level; and
    adding the at least one altitude level and the at least one altitude adjustment parameter for each altitude level to the measurement parameter adjustment rule.

3. The method of claim 1, wherein the at least one UAV altitude level comprises at least one of a first altitude level, a second altitude level, or a third altitude level, wherein each UAV altitude level corresponds to a UAV altitude segment, and respective UAV altitude segments of different UAV altitude levels are different from each other.

4. The method of claim 1, wherein sending the measurement parameter adjustment rule to the UAV comprises:
    broadcasting the measurement parameter adjustment rule through system signaling.

5. A method for cell reselection, the method being applied to an unmanned aerial vehicle (UAV) and comprising:
    receiving from a base station a measurement parameter adjustment rule for cell reselection, the measurement parameter adjustment rule comprising at least one UAV altitude level and each UAV altitude level corresponding to at least one altitude adjustment parameter;
    determining an altitude adjustment parameter corresponding to a current altitude of the UAV according to the measurement parameter adjustment rule;
    adjusting a measurement parameter for cell reselection according to the corresponding altitude adjustment parameter, wherein the altitude adjustment parameter comprises an altitude offset value for a first measurement parameter, the first measurement parameter being a cell reselection hysteresis value; and adjusting the measurement parameter for cell reselection comprises: calculating a sum of the cell reselection hysteresis value and the altitude offset value for the cell reselection hysteresis value, as an adjusted cell reselection hysteresis value; and
    performing cell reselection by using the adjusted measurement parameter.

6. The method of claim 5, wherein determining the altitude adjustment parameter corresponding to the current altitude of the UAV according to the measurement parameter adjustment rule comprises:
    determining, according to the measurement parameter adjustment rule, a UAV altitude level to which the current altitude of the UAV belongs; and
    reading, from the measurement parameter adjustment rule, all altitude adjustment parameters corresponding to the UAV altitude level to which the current altitude of the UAV belongs, all the read altitude adjustment parameters being altitude adjustment parameters corresponding to the current altitude of the UAV.

7. The method of claim 5, wherein the altitude adjustment parameter comprises: an altitude scale factor for a second measurement parameter, the second measurement parameter being a cell reselection timer, and
    adjusting the measurement parameter for cell reselection according to the corresponding altitude adjustment parameter comprises:
    calculating a product of the cell reselection timer and the altitude scale factor for the cell reselection timer, as an adjusted cell reselection timer.

8. A base station, comprising:
    a processor; and
    a memory storing instructions executable by the processor,
    wherein the processor is configured to:
    configure a measurement parameter adjustment rule to be used by an unmanned aerial vehicle (UAV) in cell reselection, the measurement parameter adjustment rule comprising at least one UAV altitude level and each UAV altitude level corresponding to at least one altitude adjustment parameter, wherein the at least one altitude adjustment parameter comprises at least one of: an altitude offset value for a first measurement parameter or an altitude scale factor for a second measurement parameter, different UAV altitude levels corresponding to different values of a same altitude adjustment parameter, the first measurement parameter being a cell reselection hysteresis value, and the second measurement parameter being a cell reselection timer; and send the measurement parameter adjustment rule to the UAV.

9. The base station of claim 8, wherein the processor is further configured to:
configure an altitude determination rule for the UAV, the altitude determination rule comprising at least one altitude level;
configure at least one altitude adjustment parameter for each altitude level; and
add the at least one altitude level and the at least one altitude adjustment parameter for each altitude level to the measurement parameter adjustment rule.

10. The base station of claim 8, wherein the at least one UAV altitude level comprises at least one of a first altitude level, a second altitude level, or a third altitude level, wherein each UAV altitude level corresponds to a UAV altitude segment, and respective UAV altitude segments of different UAV altitude levels are different from each other.

11. The base station of claim 8, wherein the processor is further configured to:
broadcast the measurement parameter adjustment rule through system signaling.

12. A device for cell reselection, the device being applied to an unmanned aerial vehicle (UAV) and comprising:
a processor; and
a memory storing instructions executable by the processor,
wherein the processor is configured to:
receive from a base station a measurement parameter adjustment rule for cell reselection, the measurement parameter adjustment rule comprising at least one UAV altitude level and each UAV altitude level corresponding to at least one altitude adjustment parameter;
determine an altitude adjustment parameter corresponding to a current altitude of the UAV according to the measurement parameter adjustment rule;
adjust a measurement parameter for cell reselection according to the corresponding altitude adjustment parameter, wherein the altitude adjustment parameter comprises an altitude offset value for a first measurement parameter, the first measurement parameter being a cell reselection hysteresis value; and adjusting the measurement parameter for cell reselection comprises: calculating a sum of the cell reselection hysteresis value and the altitude offset value for the cell reselection hysteresis value, as an adjusted cell reselection hysteresis value; and
perform cell reselection by using the adjusted measurement parameter.

13. The device of claim 12, wherein the processor is further configured to:
determine, according to the measurement parameter adjustment rule, a UAV altitude level to which a current altitude of the UAV belongs; and
read, from the measurement parameter adjustment rule, all altitude adjustment parameters corresponding to the UAV altitude level to which the current altitude of the UAV belongs, all the read altitude adjustment parameters being altitude adjustment parameters corresponding to the current altitude of the UAV.

14. The device of claim 12, wherein the altitude adjustment parameter comprises: an altitude scale factor for a second measurement parameter, the second measurement parameter being a cell reselection timer, and
the processor is further configured to:
calculate a product of the cell reselection timer and the altitude scale factor for the cell reselection timer, as an adjusted cell reselection timer.

* * * * *